(12) United States Patent
Katsumata

(10) Patent No.: US 9,329,041 B2
(45) Date of Patent: May 3, 2016

(54) ANGULAR VELOCITY SENSOR

(71) Applicant: DENSO CORPORATION, Kariya, Aichi-pref. (JP)

(72) Inventor: Takashi Katsumata, Kariya (JP)

(73) Assignee: DENSO CORPORATION, Kariya (JP)

( * ) Notice: Subject to any disclaimer, the term of this patent is extended or adjusted under 35 U.S.C. 154(b) by 616 days.

(21) Appl. No.: 13/765,993

(22) Filed: Feb. 13, 2013

(65) Prior Publication Data

US 2013/0239683 A1 Sep. 19, 2013

(30) Foreign Application Priority Data

Mar. 13, 2012 (JP) .................................. 2012-56262

(51) Int. Cl.
*G01C 19/00* (2013.01)
*G01C 19/5642* (2012.01)
*G01C 19/574* (2012.01)

(52) U.S. Cl.
CPC .......... *G01C 19/5642* (2013.01); *G01C 19/574* (2013.01)

(58) Field of Classification Search
CPC .. G01C 19/56; G01C 19/5642; G01C 19/574; G01P 3/44
See application file for complete search history.

(56) References Cited

U.S. PATENT DOCUMENTS

| | | | | |
|---|---|---|---|---|
| 5,992,233 A * | 11/1999 | Clark | ................. | G01C 19/5719 361/280 |
| 6,430,998 B2 * | 8/2002 | Kawai | ................. | G01C 19/5719 73/504.12 |
| 6,794,272 B2 * | 9/2004 | Turner | ............... | H01L 21/76898 257/E21.237 |
| 6,939,473 B2 * | 9/2005 | Nasiri | ................. | G01C 19/5719 216/2 |
| 7,250,112 B2 * | 7/2007 | Nasiri | ................. | G01C 19/5719 216/2 |
| 7,267,004 B2 * | 9/2007 | Leverrier | ........... | G01C 19/5769 73/504.12 |
| 7,621,183 B2 * | 11/2009 | Seeger | ................. | G01C 19/574 73/504.04 |
| 8,020,441 B2 * | 9/2011 | Seeger | ............... | G01C 19/5719 73/504.04 |
| 8,069,726 B2 * | 12/2011 | Seeger | ............... | G01C 19/5719 73/504.04 |

(Continued)

FOREIGN PATENT DOCUMENTS

EP 2238460 B1 * 8/2013 ......... G01C 19/5712
JP 2002-213962 A 7/2002

(Continued)

OTHER PUBLICATIONS

Office Action dated Apr. 20, 2015 issued in corresponding CN patent application No. 201310079058.8 (and English translation).

(Continued)

*Primary Examiner* — Laura Martin
*Assistant Examiner* — Samir M Shah
(74) *Attorney, Agent, or Firm* — Posz Law Group, PLC

(57) ABSTRACT

An angular velocity sensor includes a vibrator located along x-y plane specified by x direction and y direction that are orthogonal to each other; a substrate that is separated away from the vibrator along z direction perpendicular to the x-y plane; an anchor device extended from the substrate to the x-y plane in which the vibrator is located; a linkage beam device that links the anchor device to the vibrator, the linkage beam being able to twist about the y direction; an excitation portion that vibrates the vibrator along the z direction; and a detection portion that detects an angular velocity based on a displacement along the x direction of the vibrator. The vibrator includes a linkage region to link with the linkage beam device, and the linkage region becomes a wave node when the vibrator vibrates along the z direction.

31 Claims, 11 Drawing Sheets

(56) References Cited

U.S. PATENT DOCUMENTS

| | | | |
|---|---|---|---|
| 8,216,882 B2* | 7/2012 | Lin | B81B 7/02 257/E29.001 |
| 8,250,921 B2* | 8/2012 | Nasiri | G01P 1/023 73/493 |
| 8,316,718 B2* | 11/2012 | Lin | B81C 1/00309 438/50 |
| 8,466,606 B2* | 6/2013 | Chen | H03H 3/007 310/344 |
| 8,476,809 B2* | 7/2013 | Chen | H03H 3/007 310/344 |
| 9,052,194 B2* | 6/2015 | Seeger | G10C 19/5719 |
| 9,097,524 B2* | 8/2015 | Seeger | G01C 19/5755 |
| 9,170,107 B2* | 10/2015 | Anac | G01C 19/574 |
| 2003/0110858 A1* | 6/2003 | Kim | G01C 19/5762 73/504.02 |
| 2003/0131664 A1 | 7/2003 | Mochida et al. | |
| 2003/0164041 A1* | 9/2003 | Jeong | G01C 19/5712 73/504.08 |
| 2004/0154400 A1 | 8/2004 | Johnson et al. | |
| 2006/0219006 A1 | 10/2006 | Nasiri et al. | |
| 2008/0115579 A1* | 5/2008 | Seeger | G01C 19/574 73/504.12 |
| 2010/0064805 A1 | 3/2010 | Seeger et al. | |
| 2010/0132460 A1 | 6/2010 | Seeger et al. | |

FOREIGN PATENT DOCUMENTS

| | | | |
|---|---|---|---|
| JP | 2007-101203 A | 4/2007 | |
| JP | 2008-256578 A | 10/2008 | |
| JP | 2012-047537 A | 3/2012 | |
| WO | WO 2009130554 A2 * | 10/2009 | G01C 19/5712 |

OTHER PUBLICATIONS

Office Action mailed Jun. 17, 2014 in the corresponding JP application No. 2012-056262 (and English translation).

* cited by examiner

ANGULAR VELOCITY SENSOR

CROSS-REFERENCE TO RELATED APPLICATION

The present application is based on Japanese Patent Application No. 2012-56262 filed on Mar. 13, 2012, the disclosure of which is incorporated herein by reference.

TECHNICAL FIELD

The present disclosure relates to an angular velocity sensor that includes a vibrator, an excitation portion to vibrate the vibrator along z direction, and a detection device to detect displacement along x direction of the vibrator.

BACKGROUND ART

[Patent Literature 1] US-2010/0064805 A

Patent Literature 1 proposes a sensing frame that includes a base, a first rail and a second rail that move along a first direction, and a first guiding arm and a second guiding arm that link the first rail to the second rail. The first guiding arm is attached to a first anchor of the base so as to rotate about a second direction orthogonal to the first direction; the second guiding arm is attached to a second anchor of the base so as to rotate about a third direction parallel with the second direction. Movement of the first rail and the second rail is attained along the first direction with the opposite phases. Angular velocity is detected by sensing the displacement of the rails due to the application of the angular velocity. The first direction may apply to the direction in which the base and the first rail are linked.

In the sensing frame indicated in Patent Literature 1, two rails are linked with the guiding arms and the guiding arms are attached to the anchors. This configuration causes the vibration, which is produced when the rails move, to propagate to the anchors via the guiding arms. The vibration propagating to the anchors are reflected by the base, and the vibration reflected returns to the rails via the anchors and guiding arms. As a result, the movement state of the rails become unstable, involving a defect to decrease the detection accuracy in angular velocity.

SUMMARY

It is an object to provide an angular velocity sensor that suppresses a decline of a detection accuracy in angular velocity.

To achieve the object, according to an example of the present disclosure, an angular velocity sensor is provided to include a vibrator; a substrate; an anchor device; a linkage beam device; an excitation portion; and a detection portion. The vibrator is located in x-y plane specified by x direction and y direction that are orthogonal to each other. The substrate is separated away from the vibrator along z direction perpendicular to the x-y plane. The anchor device is extended from the substrate to the x-y plane in which the vibrator is located. The linkage beam device links the anchor device to the vibrator, the linkage beam being able to twist about the y direction. The excitation portion vibrates the vibrator along the z direction. The detection portion detects an angular velocity based on a displacement along the x direction of the vibrator. Further, the angular velocity sensor is characterized in that the vibrator includes a linkage region that links with the linkage beam device, and the linkage region becomes a wave node when the vibrator vibrates along the z direction.

According to the example of the present disclosure, in the vibrator, the linkage region linked with the linkage beam device serves as a wave node when the vibrator vibrates along the z direction. The wave node is a point, in which the vibration is zero and the amplitude or displacement is zero. Therefore, under the above configuration, the vibration of the vibrator is suppressed from propagating to the substrate via the linkage beam device and the anchor device. This configuration inhibits the substrate from reflecting the vibration propagating to the substrate and also inhibits the reflected vibration from returning to the vibrator. As a result, the vibrational state of the vibrator is inhibited from becoming unstable; the detection accuracy in the angular velocity is inhibited from decreasing.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

The following describes embodiments of the present disclosure with reference to drawings.

First Embodiment

Figure 1:
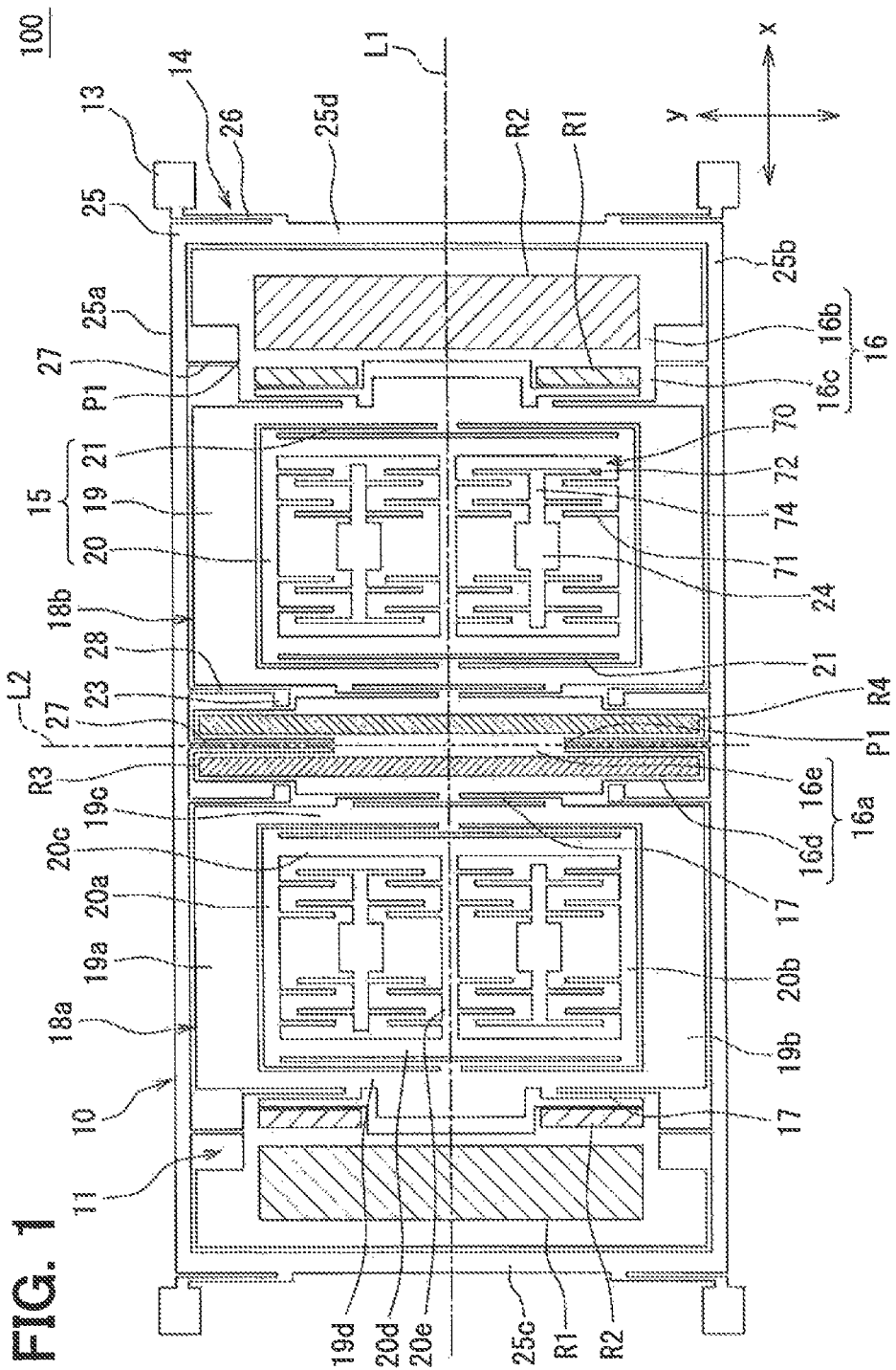
FIG. 1 is a top view illustrating an outline configuration of an angular velocity sensor according to a first embodiment.
Figure 2:
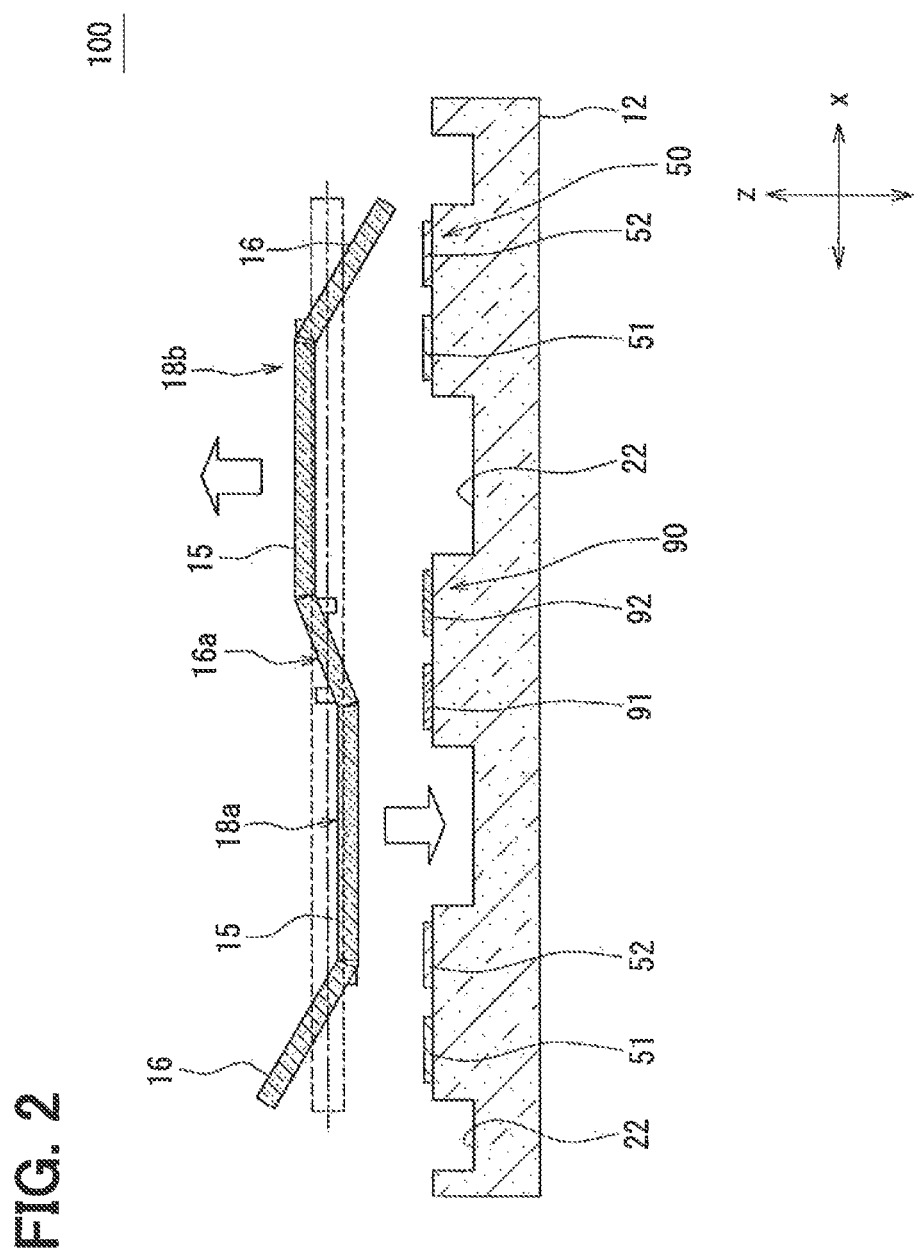
FIG. 2 is a sectional view illustrating a driving state of a vibrator in FIG. 1.

The following will explain an angular velocity sensor according to a first embodiment with reference to FIGS. 1 to 7. FIG. 1 provides hatching to facing ranges R1 to R4 (mentioned later) of a vibrator 11; the facing ranges R1 to R4 face electrodes 51, 52, 91, 92. FIG. 2 illustrates a sectional view of the vibrator 11 along a penetrating direction L1 illustrated in FIG. 1, while illustrating an immovable state of the vibrator 11 using a range surrounded by broken lines. FIG. 4 to FIG. 7 omit components unnecessary for explaining a moving state of the vibrator 11 to illustrate schematically. Schematic illustration contains the components overlapping, which should not be overlapping actually. FIG. 4 to FIG. 7 are obtained from a simulation, and a little different from the configuration in FIG. 1 to FIG. 3; however, they have the same configuration in a fundamental portion (featured portion of the present disclosure).

The following defines three axes of x axis, y axis, and z axis; three axes are orthogonal to each other. Further, a direction parallel with the x axis is referred to as an x direction; a direction parallel with the y axis is referred to as a y direction; and a direction parallel with the z axis is referred to as a z direction. Yet further, x-y plane is defined as being specified by the x direction and the y direction; y-z plane is defined as being specified by the y direction and the z direction; and z-x plane is defined as being specified by the z direction and the x direction.

Figure 3:
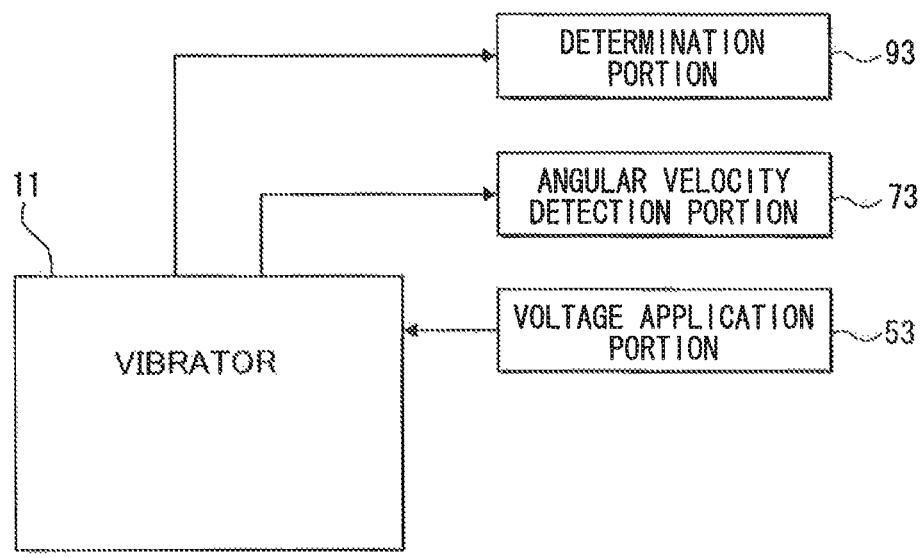
FIG. 3 is a block diagram illustrating an electrical route of the angular velocity sensor.

With reference to FIG. 1 to FIG. 3, an angular velocity sensor 100 mainly includes a sensor portion 10, an excitation portion 50, and a detection portion 70. The sensor portion 10 includes a vibrator 11 that is vibrated by the excitation portion 50. When an angular velocity is applied to the vibrator 11 in a vibrational state, Coriolis force arises in the direction, which is orthogonal to (i) the vibrating direction and (ii) the applying direction of the angular velocity, to displace the vibrator 11 in the applying direction of the Coriolis force. This displacement of the vibrator 11 is detected by the detection portion 70, permitting the detection or calculation of an angular velocity. The angular velocity sensor 100 according to the present embodiment is used under a vacuum atmosphere.

The sensor portion 10 includes the following: a vibrator 11; a substrate 12 located separate from the vibrator 11 along the z direction; an anchor device 13 which includes four main anchors extended to a height position of the vibrator 11; and a linkage beam device 14 which links the anchor device 13 with the vibrator 11. The vibrator 11 is linked with the anchor device 13 via the linkage beam device 14; the vibrator 11 appears to be floating over the substrate 12. The vibrator 11 is vibrated by the excitation portion 50 as described above; the vibrator 11 has a linkage region P1 that is linked with the linkage beam device 14 and the linkage region P1 becomes a wave node when the vibrator 11 vibrates along the z direction.

The vibrator 11 includes up-down weights 15; inclination weights 16 linked with the linkage beam device 14; and twist beams 17 which link the inclination weights 16 with the up-down weights 15. The vibrator 11 includes one inclination weight 16 located at a center (in the x direction) of the vibrator 11, which will be referred to as a central weight 16a. A left side is defined herein as being the left side in the drawings viewed from the central weight 16a along the x direction; a right side is defined herein as being the right side in the drawings viewed from the central weight 16a along the x direction. The number of up-down weights 15 and the number of inclination weights 16 are individually identical in both the left side and the right side. A unit weight portion 18 is defined as collectively including one up-down weight 15, one inclination weight 16 next to the one up-down weight 15, and twist beams 17 linking between the one up-down weight 15 and the one inclination weight 16. The unit weight portion(s) 18 located in the left side are referred to as a left unit weight 18a; the unit weight portion(s) 18 located in the right side are referred to as a right unit weight 18b. It is noted that the drawing omits the reference sign 18 but illustrates the reference signs 18a and 18b.

In the present embodiment, the vibrator 11 has (i) the left unit weigh 18a that has only one unit weight portion 18 and (ii) the right unit weight 18b that has only one right unit weight portion 18. In this vibrator 11, the left and right unit weights 18a and 18b are formed to be symmetrical with respect to a first penetrating direction L1 (indicated with one-dot chain line in FIG. 1) that penetrates through a center of each of the unit weights 18a and 18b themselves along the x direction; the left and right unit weights 18a and 18b are formed to be symmetrical with respect to a second penetrating direction L2 (indicated with two-dot chain line in FIG. 1) that penetrates through a center of the central weight 16a along the y direction.

The up-down weight 15 includes a first frame portion 19 having an outer face linked with the twist beam 17; a second frame portion 20 located in a range surrounded by an inner face of the first frame portion 19; and detection beams 21 that link the first frame portion 19 with the second frame portion 20, the detection beams 21 having flexibility along the x direction.

The first frame portion 19 includes two first bars 19a and 19b extended along the x direction, and two second bars 19c and 19d extended along the y direction. The bars 19a to 19d are linked at respective end portions, forming a loop having an external outline of a quadrangular shape along the x-y plane. The thickness along the y direction of each of the first bars 19a and 19b is larger than the thickness along the x direction of each of the second bars 19c and 19d. A center of the second bar 19d projects towards the inclination weight 16; the center is thicker than others. The second bar 19c includes two projections on a face facing the central weight 16a in order to link with both end portions of one twist beam 17. The second bar 19d includes two projections on a face facing the inclination weight 16 in order to link with one end portion of each of two twist beams 17. The second bar 19c includes one projection on a face facing the second frame portion 20 in order to link with a center of one detection beam 21. The second bar 19d includes one projection on a face facing the second frame portion 20 in order to link with a center of one detection beam 21. Further, in the second bar 19d, the projection from the face facing the inclination weight 16 is formed away along the y direction from the projection towards the second frame portion 20.

The second frame portion 20 includes two third bars 20a and 20b extended along the x direction, two fourth bars 20c and 20d extended along the y direction, and one fifth bar 20e extended along the x direction. The bars 20a to 20d are linked at respective end portions, forming a loop having an external outline of a quadrangular shape along the x-y plane. An inside of the loop is equally divided into two by the fifth bar 20e, providing a planar shape similar to Japanese Kanji character "日" (similar to the shape of two adjoining quadrangles arranged along the y direction on the x-y plane). The thickness along the y direction of each of the third bars 20a and 20b and the fifth bar 20e is smaller than the thickness along the x direction of each of the fourth bars 20c and 20d; the end portions of the fifth bar 20e are linked with centers of inner faces of the fourth bars 20c and 20d, respectively. The fourth bar 20c includes a projection that is provided at each of both end portions of a face facing the second bar 19c in order to link with each of both end portions of one detection beam 21. The fourth bar 20d includes a projection that is provided at each of both end portions of a face facing the second bar 19d in order to link with each of both end portions of one detection beam 21.

In the present embodiment, the inclination weight 16 included in the unit weight portion 18 is different from the inclination weight 16 (central weight 16a) located at the center of the vibrator 11 in respect of shape, and, therefore, will be explained to be differentiated from the central weight 16a.

The inclination weight 16 includes a base portion 16b having a convex along the x-y plane to be partially convex towards the central weight 16a, and a projection portion 16c further projecting from each of both end portions of the convex of the base portion 16b. Each of the two projections 16c includes one projection on a face facing the inclination weight 16 in order to link with the other end portion of the twist beam 17; a side face along the y direction of the projection portion 16c is linked with one end portion of the second linkage beam 27, mentioned later. This configuration permits an end portion along the x direction separating away from the central weight 16a of the base portion 16b to serve as a free end.

The central weight 16a includes two wing portions 16d each having a convex along the x-y plane to be partially convex towards the up-down weight 15, and a linkage portion 16e linking the two wing portions 16d to each other. Each of the two wing portions 16d includes one projection on a face facing the up-down weight 16 in order to link with a center of the twist beam 17; a side face along the y direction of the linkage portion 16e is linked with one end portion of the second linkage beam 27, mentioned later.

The twist beam 17 has a shape extended along the y direction, which serves as an axial; the twist beam 17 can twist around the axis. In the present embodiment, the central weight 16a and the up-down weight 15 are linked via one twist beam 17; the inclination weight 16 and the up-down weight 15 are linked via two twist beams 17. A center of the twist beam 17 linking between the central weight 16a and the up-down weight 15 is linked with a projection formed in the central weight 16a; both end portions of the twist beam 17 are linked with projections formed in the up-down weight 15. One end portion of the twist beam 17 linking between the inclination weight 16 and the up-down weight 15 is linked with a projection formed in the up-down weight 15; the other end portion of the twist beam 17 is linked with a projection formed in the inclination weight 16.

The substrate 12 supports the vibrator 11 via (i) the anchor device 13 and (ii) the linkage beam device 14. With reference to FIG. 2, the substrate 12 includes concave portions 22 on a facing range facing the vibrator 11; the concave portions 22 are provided such that a thickness along the z direction is concave locally in a direction separating from the vibrator 11. In the present embodiment, the concave portions 22 are formed in a facing range facing the up-down weight 15 in the substrate 12, and in a facing range facing the free end of the inclination weight 16 in the substrate 12.

The anchor device 13, which includes the four main anchors, fixes the vibrator 11 to the substrate 12 using the linkage beam device 14. As indicated in FIG. 1, the four main anchors of the anchor device 13 are formed outside of the range surrounded by a main frame portion 25 mentioned later. The main anchor of the anchor device 13 is located in each of four corners of the main frame portion 25, and has a projection which is linked with the other end portion of the first linkage beam 26, which will be mentioned later.

In addition, first anchors 23, which have functions different from the anchor device 13, are located in a range surrounded by the main frame portion 25; second anchors 24, which have functions different from the anchor device 13, are located in a range surrounded by the second frame portion 20. The first anchors 23 achieve the function supporting the main frame portion 25, and the second anchors 24 achieve the function supporting second detection electrodes 72 mentioned later. Two first anchors 23 are provided in each of two ranges between the central weight 16a and the up-down weights 15. One second anchor 24 is provided in each of four ranges formed by the division by the second frame portion 20.

The linkage beam device 14 links the anchor device 13 with the vibrator 11. The linkage beam device 14 includes the main frame portion 25 surrounding the vibrator 11, first linkage beams 26 which link the anchor device 13 with the main frame portion 25, and second linkage beams 27 which link the vibrator 11 with the frame portion. The linkage beam device 14 according to the present embodiment further includes third linkage beams 28 which link the main frame portion 25 with the first anchors 23.

The main frame portion 25 includes two sixth bars 25a and 25b extended along the x direction, and two seventh bars 25c and 25d extended along the y direction. The bars 25a to 25d are linked at respective end portions, forming a loop having an external outline of a quadrangular shape along the x-y plane. The thickness along the y direction of each of the sixth bars 25a and 25b is identical to the thickness along the x direction of each of the seventh bars 25c and 25d. In addition, an inner face of each of the sixth bars 25a and 25b is linked with the other end portions of two second linkage beams 27 and the other end portions of two third linkage beams 28; an outer face of each of the seventh bars 25c and 25d is provided with two projections that are linked with the other end portions of two first linkage beams 26.

The linkage beams 26 to 28 are shaped of being extended along the y direction. The first linkage beam 26 has flexibility along the x direction. Each of the second linkage beam 27 and the third linkage beam 28 has an axis that is an extended direction of each of the second linkage beam 27 and the third linkage beam 28; each of the second linkage beam 27 and the third linkage beam 28 can twist around the axis. One end portion of the first linkage beam 26 is linked with a projection formed in an outer face of each of the seventh bars 25c and 25d; the other end portion is linked with a projection formed in the anchor device 13. One end portion of the second linkage beam 27 is linked with a side face of the projection portion 16c of the inclination weight 16; the other end portion is linked with an outer face of each of the sixth bars 25a and 25b. One end portion of the second linkage beam 27 is linked with a side face of the linkage portion 16e of the central weight 16a; the other end portion is linked with an inner face of each of the sixth bars 25a and 25b. One end portion of the third linkage beam 28 is linked with the first anchor 23; the other end portion is linked with an inner face of each of the sixth bars 25a and 25b.

It is noted that in the inclination weight 16 (central weight 16a), the linkage region P1 linked with the second linkage beam 27 is the same as the region functioning as a wave node in the inclination weight 16 (central weight 16a) when the vibrator 11 vibrates. In addition, the beams 17, 27, and 28 have flexibility along the x direction, but have more difficulty in bending along the x direction than the first linkage beam 26. In other words, the first linkage beam 26 bends easier along the x direction than the beams 17, 27, and 28.

The excitation portion 50 vibrates the vibrator 11 along the z direction. More specifically, the excitation portion 50 vibrates the left unit weight 18a and the right unit weight 18b, which are arranged along the x direction and symmetrical with respect to the central weight 16a, with opposite phases, thereby vibrating the vibrator 11 along the z direction. With reference to FIGS. 2 and 3, the excitation portion 50 includes first driving electrodes 51 and second driving electrodes 52, which are formed in the substrate 12; and a voltage application portion 53 which applies driving voltages to the driving electrodes 51 and 52 and the vibrator 11. The first driving electrodes 51 and the second driving electrodes 52 face the vibrator 11 along the z direction (i.e., the vibrator 11 is viewed in the z direction from the first driving electrodes 51 and the second driving electrodes 52). The voltage application portion 53 has a function to apply, as driving voltages, alternating-current voltages of the opposite phases to the first driving electrodes 51 and the second driving electrodes 52, and a constant voltage to the vibrator 11. The application of the driving voltages produces an attractive force (repulsive force) between the vibrator 11 and the first driving electrodes 51, and repulsive force (attractive force) between the vibrator 11 and the second driving electrodes 52. Thereby, the vibrator 11 vibrates along the z direction.

In the present embodiment, as indicated in FIG. 2, one first driving electrode 51 and one second driving electrode 52, which are arranged along the x direction, face the inclination weight 16 along the z direction. Further, the first driving electrode 51 facing the inclination weight 16 of the left unit weight 18a and the second driving electrode 52 facing the inclination weight 16 of the right unit weight 18b are arranged along the x direction and symmetrical with respect to the central weight 16a. In contrast, the second driving electrode 52 facing the inclination weight 16 of the left unit weight 18a and the first driving electrode 51 facing the inclination weight 16 of the right unit weight 18b are arranged along the x direction and symmetrical with respect to the central weight 16a. As indicated with hatching in FIG. 1, the shape of a facing range R1 of the inclination weight 16 facing the first driving electrode 51 along the z direction and the shape of the facing range R2 of the inclination weight 16 facing the second driving electrode 52 along the z direction are individually symmetrical with respect to a penetrating direction L1. In addition, a third penetrating direction (unshown) penetrates through the linkage region P1, which is linked with the second linkage beam 27 in the inclination weight 16, along the y direction; the division by the third penetrating direction forms two ranges. The first facing range R1 is located in one range of those two ranges, and the second facing range R2 is located in the remaining range of those two ranges. Thereby, when the one range formed from the division by the third penetrating direction receives a repulsive force (attractive force), the remaining range receives an attractive force (repulsive force). The magnitude of the repulsive force (attractive force) received by the one range is the same as the magnitude of the attractive force (repulsive force) received by the remaining range.

The detection portion 70 detects an angular velocity based on a displacement along the x direction of the vibrator 11. More specifically, the detection portion 70 detects an angular velocity based on a displacement along the x direction of each of the left and right unit weights 18a and 18b. The detection portion 70 includes first detection electrodes 71 formed in an inner face of the second frame portion 20; supporting beams 74 extended along the x direction from the second anchors 24; second detection electrodes 72 formed in the supporting beams 74 and facing the first detection electrodes 71 along the x direction; and an angular velocity detection portion 73 to detect an angular velocity based on a change (displacement along the x direction of the vibrator 11) in an electrostatic capacity of a capacitor composed of the detection electrodes 71, 72.

As illustrated in FIG. 1, the first detection electrodes 71 have shapes to be extended along the y direction from (i) the inner faces of the third bars 20a and 20b, and (ii) the side face of the fifth bar 20e; the second detection electrodes 72 have shapes to be extended along the y direction from the side faces of the supporting beams 74. The first detection electrodes 71 and the second detection electrodes 72 bite each other and face mutually along the x direction, thereby forming a bipectinate shaped electrode. The first detection electrodes 71 are displaced against the second detection electrodes 72 according to a displacement of the second frame portion 20; this varies the electrostatic capacity of the capacitor.

The angular velocity detection portion 73 detects an angular velocity based on a difference between an electrostatic capacity of a right capacitor and an electrostatic capacity of a left capacitor; the left capacitor is composed of the first detection electrodes 71 formed in the up-down weight 15 of the left unit weight 18a whereas the right capacitor is composed of the first detection electrodes 71 formed in the up-down weight 15 of the right unit weight 18b.

The angular velocity sensor 100 according to the present embodiment has a monitor portion 90 which observes a vibrational state of the vibrator 11. The monitor portion 90 includes a first monitor electrode 91 and a second monitor electrode 92 which are formed in the substrate 12 to face the vibrator 11 along the z direction; and a determination portion 93 which determines a vibrational state of the vibrator 11 based on a potential fluctuation of each of the first monitor electrode 91 and the second monitor electrode 92 due to the variation of the vibrator 11. In the present embodiment, the first monitor electrode 91 faces the wing portion 16d, which is next to the left unit weight 18a, along the z direction; the second monitor electrode 92 faces the wing portion 16d, which is next to the right unit weight 18b, along the z direction. Further, in the present embodiment, as illustrated by hatching in FIG. 1, the shape of a facing range R3 of the wing portion 16d facing the first monitor electrode 91 along the z direction and the shape of a facing range R4 of the wing portion 16d facing the second monitor electrode 92 along the z direction are individually symmetrical with respect to the first penetrating direction L1. The area of the third facing range R3 and the area of the fourth facing range R4 are equal.

Figure 4:
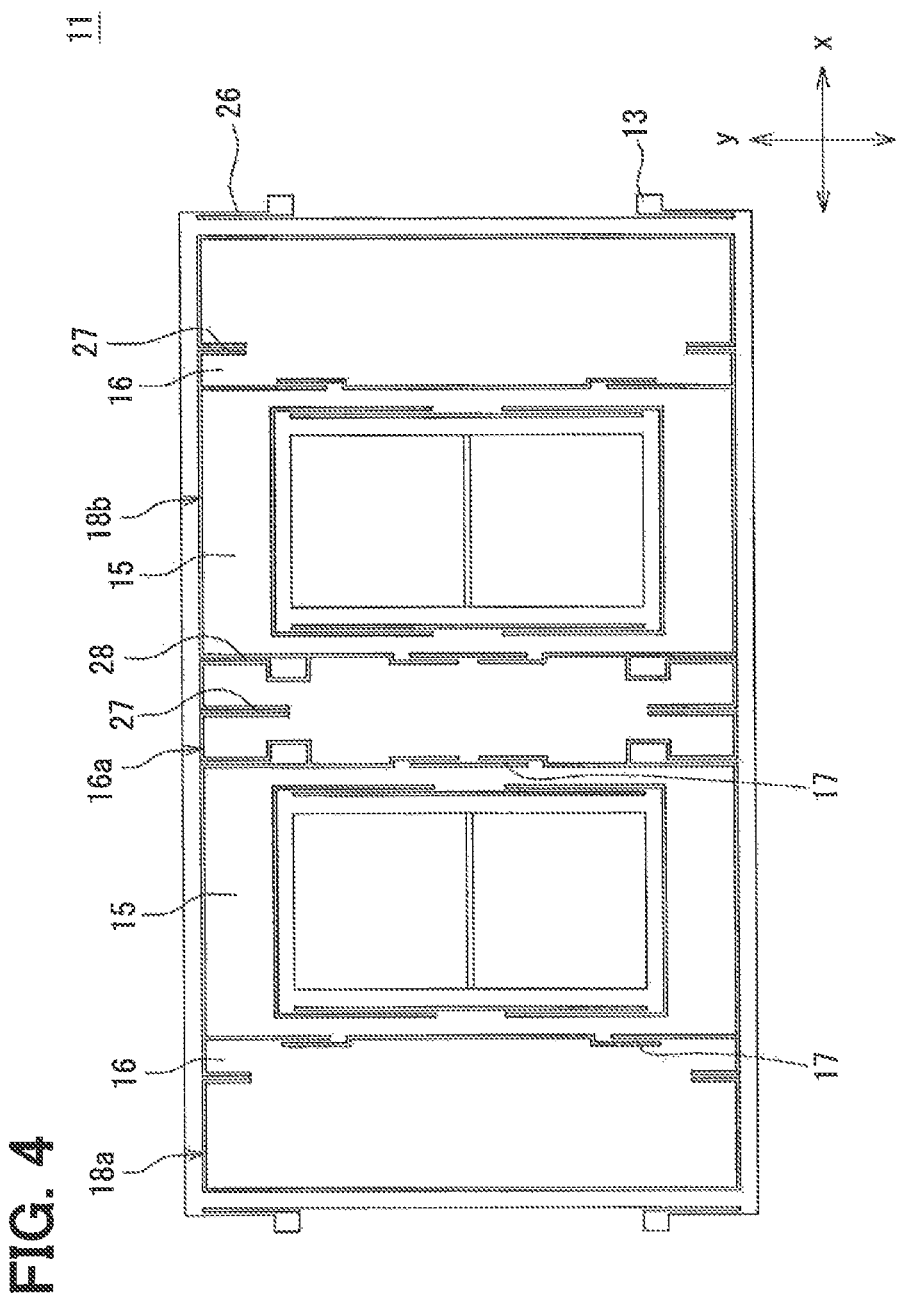
FIG. 4 is a top view illustrating an outline configuration of a vibrator.

The following will explain an operation of the angular velocity sensor 100 and a detection of an angular velocity according to the present embodiment with reference to FIG. 2 and FIG. 4 to FIG. 7. As indicated in FIG. 4, before the driving voltages are applied to the vibrator 11, the vibrator 11 is in a state to be flat along the x-y plane.

Figure 5:
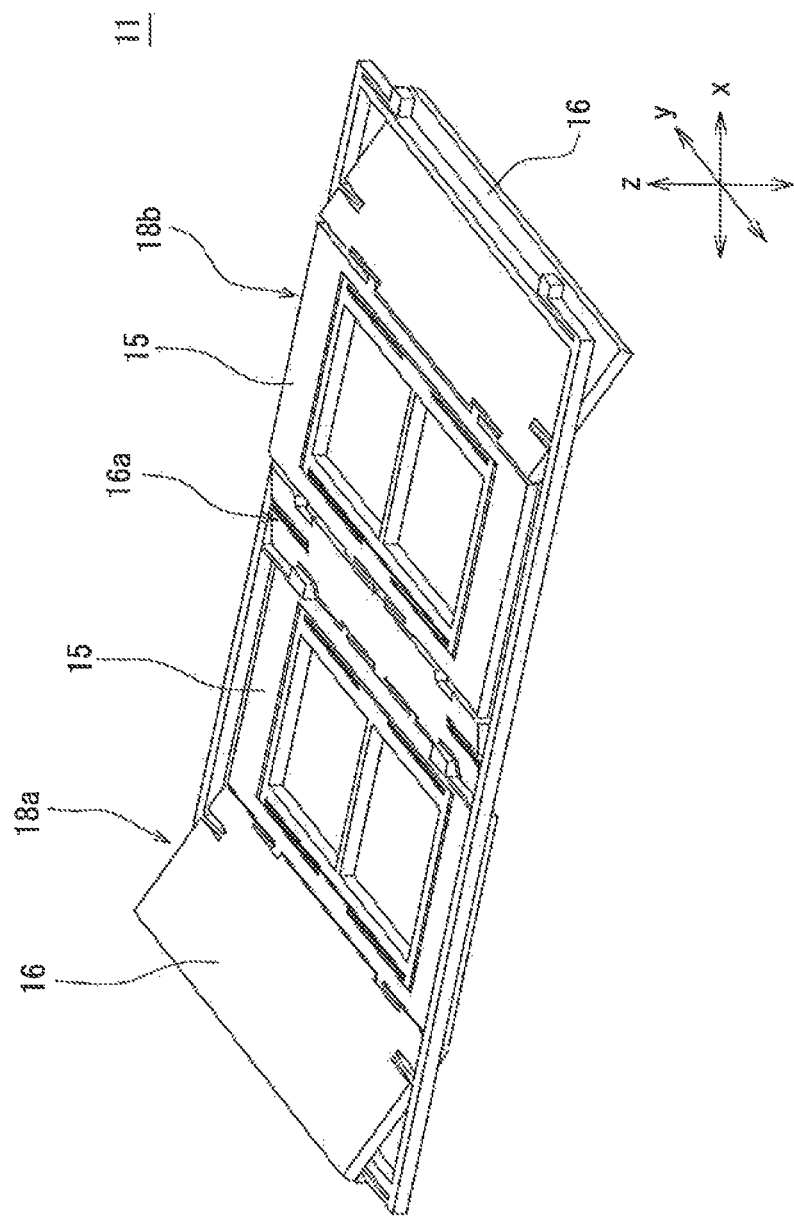
FIG. 5 is a perspective view illustrating a driving state of a vibrator.

As explained above, the first driving electrode 51 facing the inclination weight 16 of the left unit weight 18a and the second driving electrode 52 facing the inclination weight 16 of the right unit weight 18b are arranged along the x direction and symmetrical with respect to the central weight 16a. In contrast, the second driving electrode 52 facing the inclination weight 16 of the left unit weight 18a and the first driving electrode 51 facing the inclination weight 16 of the right unit weight 18b are arranged along the x direction and symmetrical with respect to the central weight 16a. Therefore, when the current-alternating voltages of the opposite phases are applied to the first driving electrodes 51 and the second driving electrodes 52 and a fixed voltage is applied to the vibrator 11, electrostatic forces are applied to symmetrical positions of the left unit weight 18a and the right unit weight 18b in the opposite directions along the z direction. Then, the beams 17, 27, and 28 take their extended directions (y direction) as directions of axes, and twist about the axes; the inclination weight 16 and the central weight 16a move in the shape of the seesaw along the y-z plane centering on the linkage region P1 linked with the second linkage beam 27. As a result, the left unit weight 18a and the right unit weight 18b carry out the coupled oscillation in the opposite directions along the z direction. As illustrated in FIG. 2 and FIG. 5, when the up-down weight 15 of the left unit weight 18a is displaced in the direction approaching the substrate 12, the up-down weight 15 of the right unit weight 18b is displaced in the direction separating away from the substrate 12. Although not illustrated, conversely, when the up-down weight 15 of the left unit weight 18a is displaced in the direction separating away from the substrate 12, the up-down weight 15 of the right unit weight 18b is displaced in the direction approaching the substrate 12. In this case, the up-down weight 15 does not rotate along the z-x plane, and vibrates along the z direction while maintaining constant the facing area with the substrate 12 along the z direction.

Figure 6:
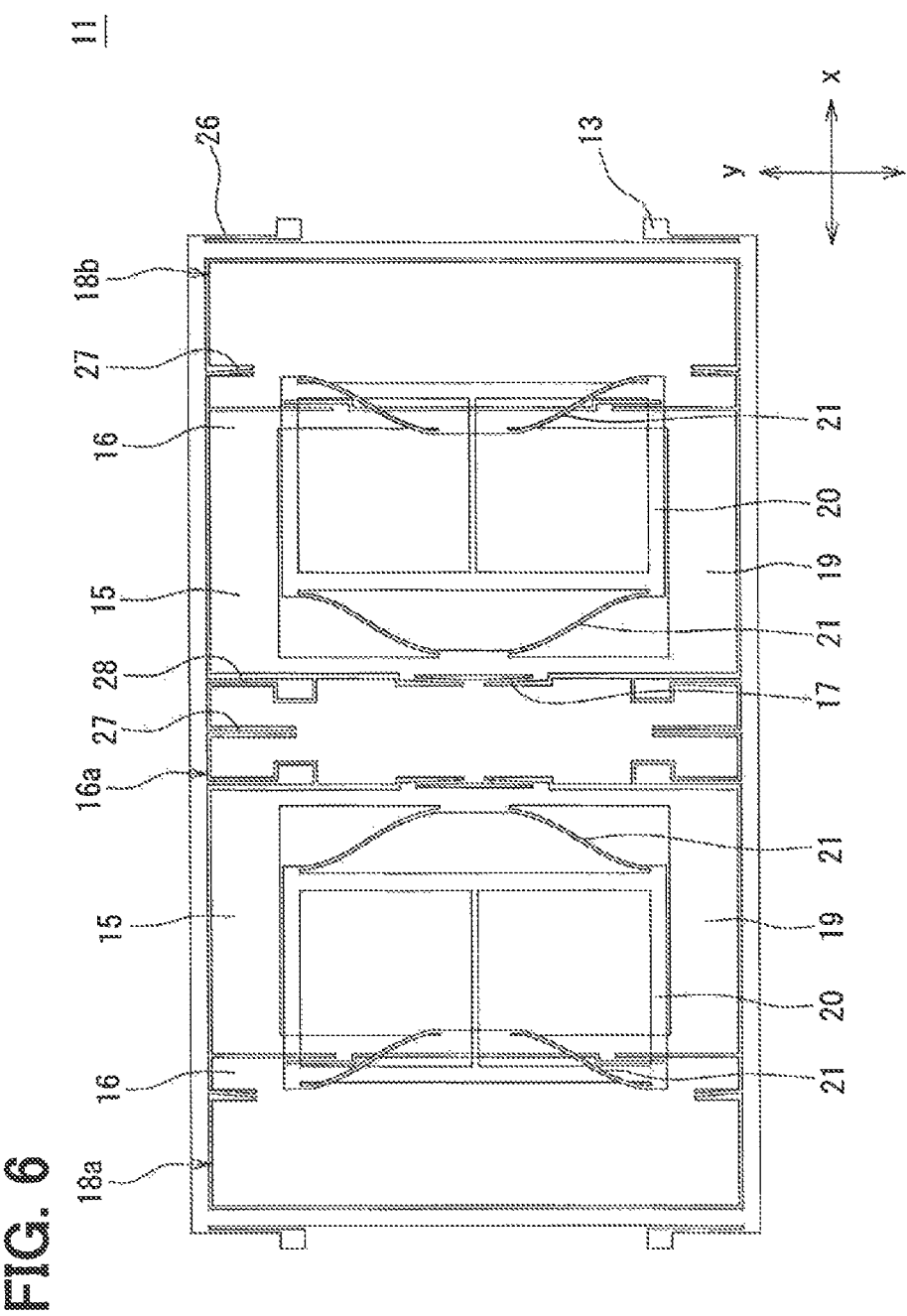
FIG. 6 is a top view illustrating a displacement of a vibrator when an angular velocity is applied along y direction.

When an angular velocity is applied along the y direction in the above-mentioned vibrational state, a Coriolis force along the x direction arises in the vibrator 11, displacing the vibrator 11 (second frame portion 20) along the x direction. Thereby, the relative distance between the detection electrodes 71 and 72 varies, and the electrostatic capacity between the detection electrodes 71 and 72 also varies. As described above, the left unit weight 18a and the right unit weight 18b are displaced to the mutually opposite directions along the z direction. Therefore, the left unit weight 18a and the right unit weight 18b receive the Coriolis force in the mutually opposite applying directions. As illustrated in FIG. 6, the detection beams 21 bend along the x direction; the second frame portions 20 of the unit weights 18a and 18b are displaced in the mutually opposite directions along the x direction. As a result, the first detection electrodes 71 included in the left capacitor and the first detection electrodes 71 included in the right capacitor are also displaced in the opposite directions along the x direction. The electrostatic capacities of the left capacitor and the right capacitor also change conversely. Therefore, the Coriolis force (angular velocity) is detected by obtaining a difference between the respective capacity variations of the left capacitor and right capacitor.

Figure 7:
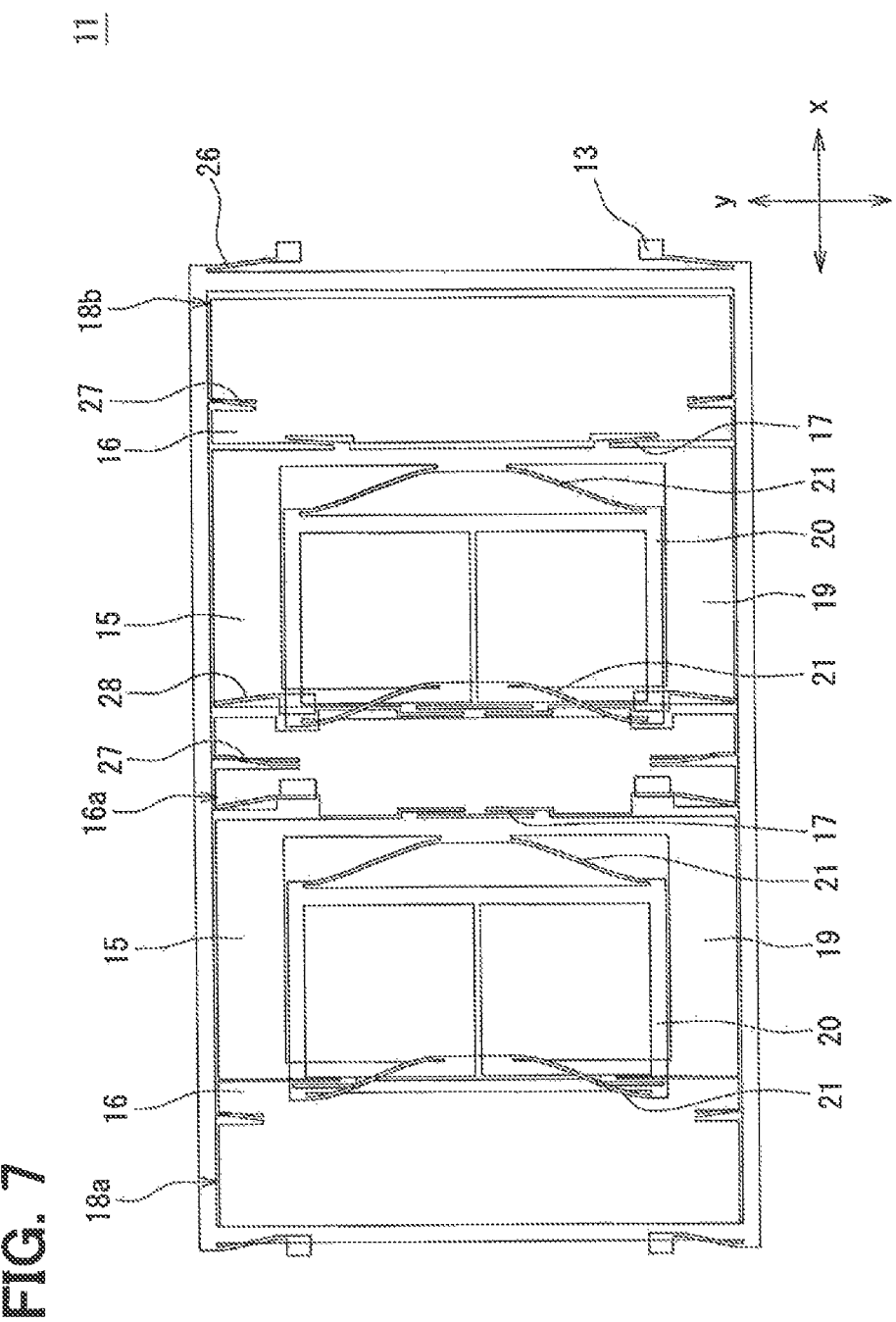
FIG. 7 is a top view illustrating a displacement of a vibrator when an external force is applied along x direction.

It is noted that when an external force such as acceleration along the x direction is applied to the vibrator 11, the second frame portion 20 of the up-down weight 15 moves also according to the external force. Thereby, the relative distance between the detection electrodes 71 and 72 varies, and the electrostatic capacity between the detection electrodes 71 and 72 also varies. However, as indicated in FIG. 7, the external force displaces the second frame portions 20 of the unit weights 18a and 18b in the same direction. Therefore, the first detection electrodes 71 included in the left capacitor and the first detection electrodes 71 included in the right capacitor are displaced in the same direction while variations of the relative distances between the detection electrodes 71 and 72 are identical in both the left unit weight 18a and the right unit weight 18b. Therefore, as described above, the capacity changes due to the external force are canceled by obtaining a difference of the capacity changes of the left capacitor and the right capacitor.

The following will explain an effect of the angular velocity sensor 100 according to the present embodiment. As explained above, in the vibrator 11, the linkage region P1 linked with the linkage beam device 14 becomes a wave node when the vibrator 11 vibrates along the z direction. The wave node is a point, in which the vibration is zero and the amplitude is zero. Therefore, according to the above configuration, the vibration of the vibrator 11 is suppressed from propagating to the substrate 12 via the linkage beam device 14 and the anchor device 13. Therefore, the vibration propagating to the substrate 12 is inhibited from being reflected by the substrate 12 and then returning to the vibrator 11. As a result, the vibrational state of the vibrator 11 is inhibited from becoming unstable, and the detection accuracy in the angular velocity is inhibited from decreasing.

The vibrator 11 includes the left unit weight 18a and the right unit weight 18b, which are symmetrical with respect to the central weight 16a. The excitation portion 50 vibrates the left unit weight 18a and the right unit weight 18b, which are arranged along the x direction and symmetrical with respect to the central weight 16a, with opposite phases; thereby the detection portion 70 detects an angular velocity based on a displacement along the x direction of each of the unit weights 18a and 18b.

Under this configuration, when an angular velocity is applied along the y direction, the left unit weight 18a and the right unit weight 18b move in the opposite directions along the x direction. By contrast, when an external force is applied along the x direction, the left unit weight 18a and the right unit weight 18b move in the direction in which the external force is applied. Therefore, if a difference between a displacement of the left unit weight 18a and a displacement of the right unit weight 18b is detected, an angular velocity is detectable while canceling an influence of the external force. This suppresses the decline of the detection accuracy in the angular velocity due to the external force.

In the vibrator 11, the shape of the first facing range R1, and the shape of the second facing range R2 are symmetrical with respect to the first penetrating direction L1.

This configuration is different from the configuration where the shape of the first facing range and the shape of the second facing range are unsymmetrical with respect to the first penetrating direction, thereby inhibiting the vibrator 11 from moving along the y-z plane. As a result, the vibrational state of the vibrator 11 is inhibited from becoming unstable, and the detection accuracy in the angular velocity is inhibited from decreasing.

The linkage beam device 14 includes the main frame portion 25 surrounding the vibrator 11, the first linkage beams 26 which links the anchor device 13 with the frame portion, and the second linkage beams 27 which links the vibrator 11 with the main frame portion 25. The first linkage beams 26 have flexibility along the x direction.

Under this configuration, the first linkage beams 26 bend when an external force is applied along the x direction, the stress applied to the vibrator 11 due to bending is reduced. As a result, a displacement of the vibrator 11 due to the external force is suppressed and the decline in the detection accuracy of the angular velocity is suppressed.

Under the present embodiment, the first linkage beams 26 bend easier along the x direction than the beams 17, 27, and 28. Thus, as compared with the configuration where the first linkage beams are not bent easier along the x direction than other beams, when an external force is applied along the x direction, a stress applied to the vibrator 11 due to bending of the first linkage beams 26 is reduced effectively.

The up-down weight 15 includes the first frame portion 19 having an outer face linked with the twist beams 17; the second frame portion 20 located in a range surrounded by an inner face of the first frame portion 19; and the detection beams 21 that link the first frame portion 19 with the second frame portion 20 and have flexibility along the x direction. Further, the detection portion 70 includes the first detection electrodes 71 formed in the inner face of the second frame portion 20, the supporting beams 74 extended along the x direction from the second anchors 24, the second detection electrodes 72 formed in the supporting beams 74, and the angular velocity detection portion 73 to detect an angular velocity based on a change (displacement in the x direction of the vibrator 11) in an electrostatic capacity of a capacitor composed of the detection electrodes 71, 72 which face each other along the x direction.

Under this configuration, the vibration in the z direction of the first frame portion 19 and the movement in the x direction of the second frame portion 20 are separated from each other with the detection beams 21 serving as a border, suppressing the variation in the movement of the second frame portion 20 due to the vibration of the first frame portion 19. This configuration suppresses the variations in the facing area and facing gap between the first detection electrode 71 and the second detection electrode 72 due to the vibration of the first frame portion 19, and also suppresses the variation in the change of the electrostatic capacity of the capacitor formed between the first detection electrode 71 and the second detection electrode 72, i.e., the displacement along the x direction of the vibrator 11. As a result, the decline of the detection accuracy in the angular velocity due to the vibration of the first frame portion 19 is suppressed.

The substrate 12 includes concave portions 22 on a facing range facing the vibrator 11; the concave portions 22 are provided such that a thickness along the z direction is concave locally in a direction separating from the vibrator 11.

This configuration inhibits the vibrator 11 from colliding with the substrate 12 when the vibrator 11 vibrates along the z direction. In addition, differently from the present embodiment using the angular velocity sensor 100 under the vacuum atmosphere, when the angular velocity sensor 100 is used under air atmosphere, the damping is inhibited from arising between the vibrator 11 and the substrate 12. Thus, the vibrational state of the vibrator 11 is inhibited from becoming unstable, and the detection accuracy in the angular velocity is inhibited from decreasing.

The monitor portion 90 is provided to observe a vibrational state of the vibrator 11. This permits the observation of the vibrational state of the vibrator 11.

The linkage beam device 14 according to the present embodiment further includes the third linkage beams 28 which link the main frame portion 25 with the first anchors 23.

This supports the main frame portion 25 with the third linkage beams 28; therefore, the main frame portion 25 is inhibited from vibrating due to an application of an external force. Thus, the vibrational state of the vibrator 11 is inhibited from becoming unstable, and the detection accuracy in the angular velocity is inhibited from decreasing.

In the vibrator 11 according to the present embodiment, the left unit weight 18a has a single unit weight portion 18; the right unit weight 18b has a single unit weight portion 18. This configuration inhibits the increase of the physique of the angular velocity sensor 100, as compared with the configuration including more than one left unit weight portion and more than one right unit weight portion. In addition, since the length of the main frame portion 25 becomes shorter, the resonance frequency of the main frame portion 25 becomes shorter. This inhibits the main frame portion 25 from vibrating due to an application of an external force, and inhibits the vibrational state of the vibrator 11 from becoming unstable. As a result, the decline of the detection accuracy in the angular velocity is inhibited.

The preferred embodiment of the present disclosure is thus described; however, without being restricted to the embodiment mentioned above, the present disclosure can be variously modified as long as not deviating from the scope thereof.

Modification

Figure 8:
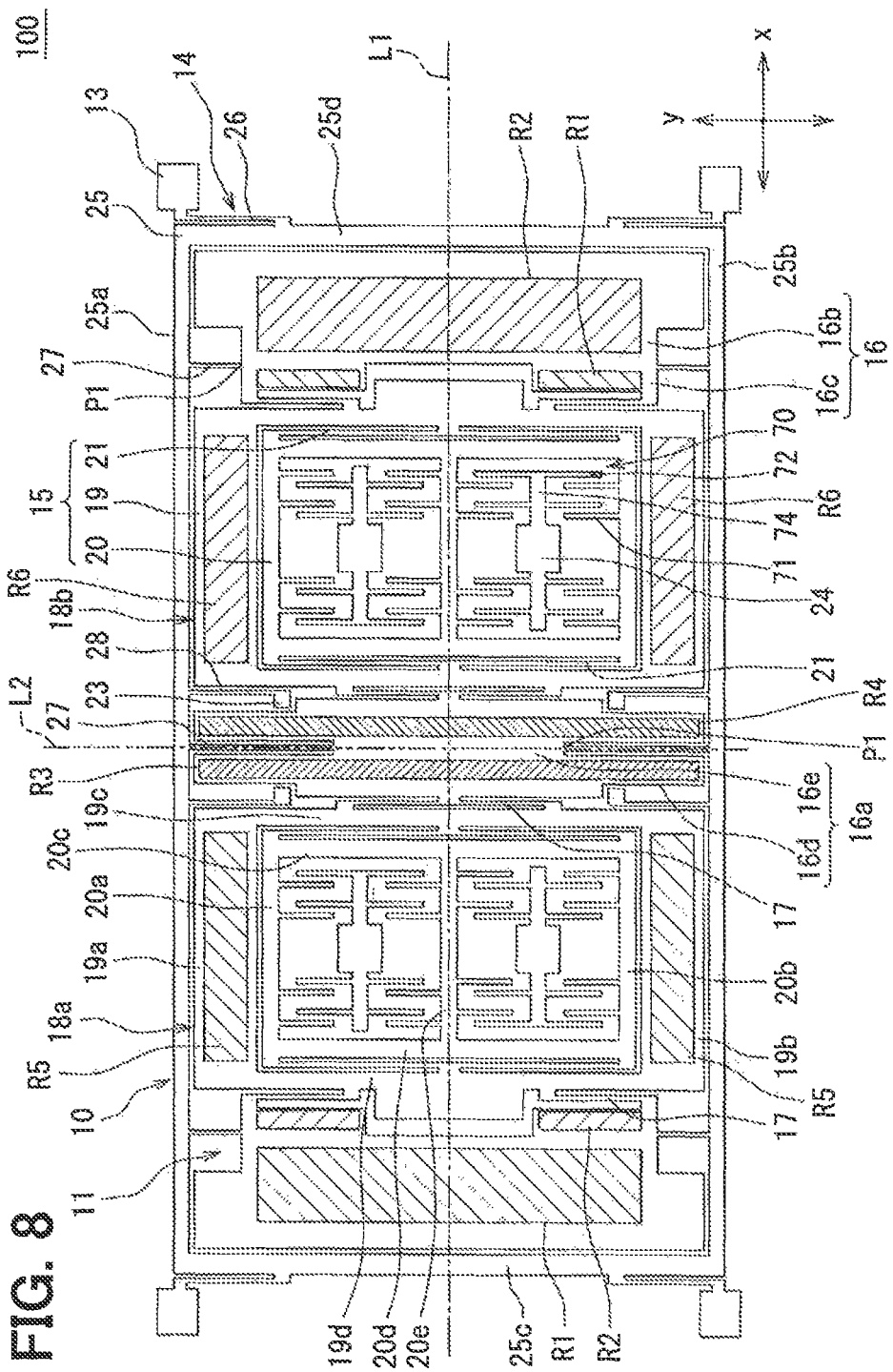
FIG. 8 is a top view illustrating a modification example of a vibrator.
Figure 9:
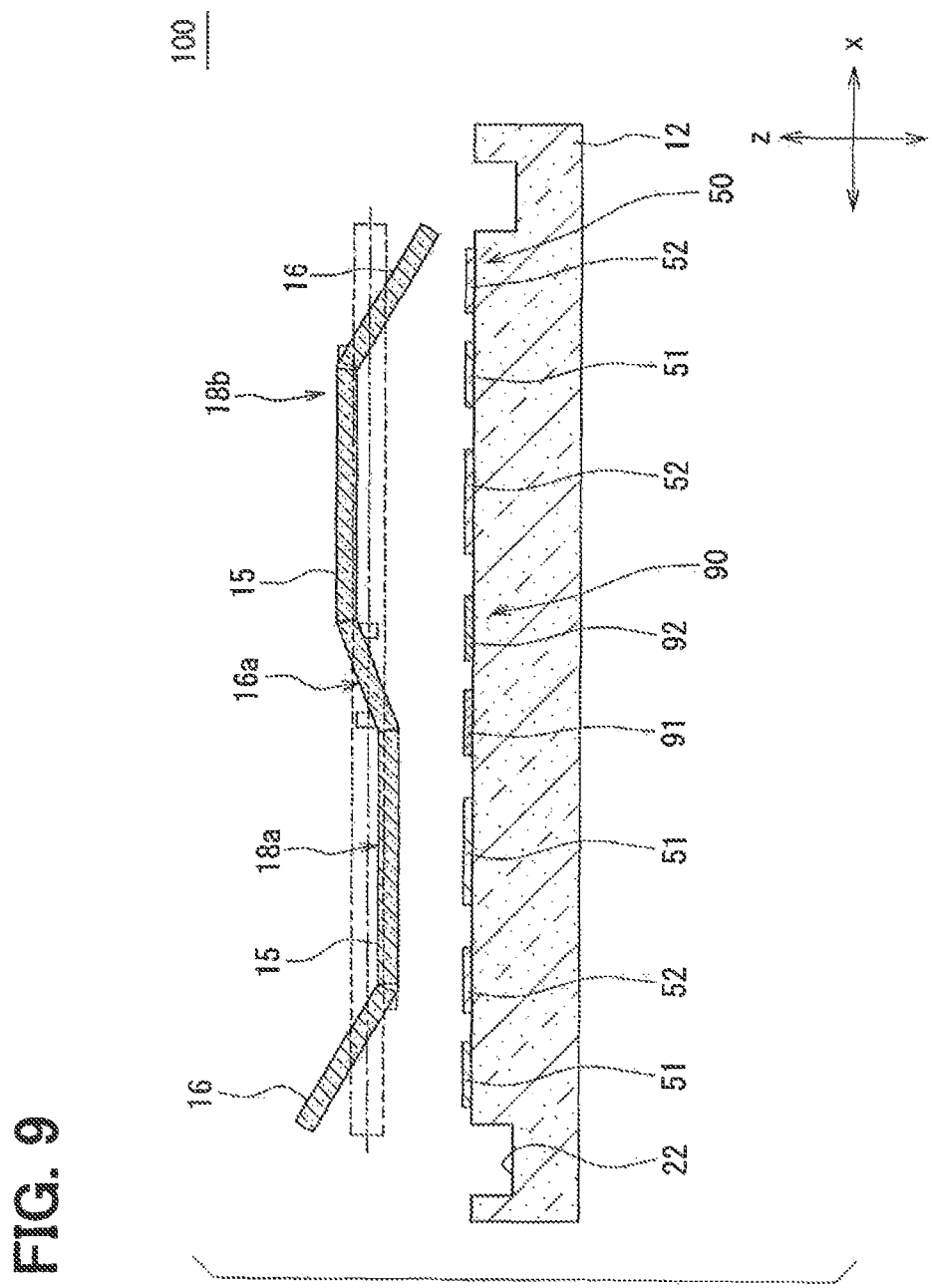
FIG. 9 is a sectional view illustrating a driving state of a vibrator in FIG. 8.

In the present embodiment, as an example, one first driving electrode 51 and one second driving electrode 52, which are arranged along the x direction, face the inclination weight 16 along the z direction. Without need to be limited thereto, as illustrated in FIG. 8 and FIG. 9, the up-down weight 15 of the left unit weight 18a may face the first driving electrode 51 along the z direction; the up-down weight 15 of the right unit weight 18b may face the second driving electrode 52 along the z direction. This configuration permits the left unit weight 18a and the right unit weight 18b to vibrate with the opposite phases, vibrating the vibrator 11 along the z direction.

In the above modification example, as indicated in FIG. 8, the shape of a facing range R5 of the up-down weight 15 facing the first driving electrode 51 along the z direction and the shape of a facing range R6 of the up-down weight 15 facing the second driving electrode 52 along the z direction are individually symmetrical with respect to the first penetrating direction. Differently from the configuration where the shape of the fifth facing range R5 and the shape of the sixth facing range R6 are unsymmetrical with respect to the first penetrating direction, the vibrator 11 is inhibited from moving along the y-z plane. As a result, the vibrational state of the vibrator 11 is inhibited from becoming unstable, and the decline of the detection accuracy in the angular velocity is inhibited. Although unshown, the up-down weight 15 of the left unit weight 18a may face the second driving electrode 52 along the z direction; the up-down weight 15 of the right unit weight 18b may face the first driving electrode 51 along the z direction.

Figure 10:
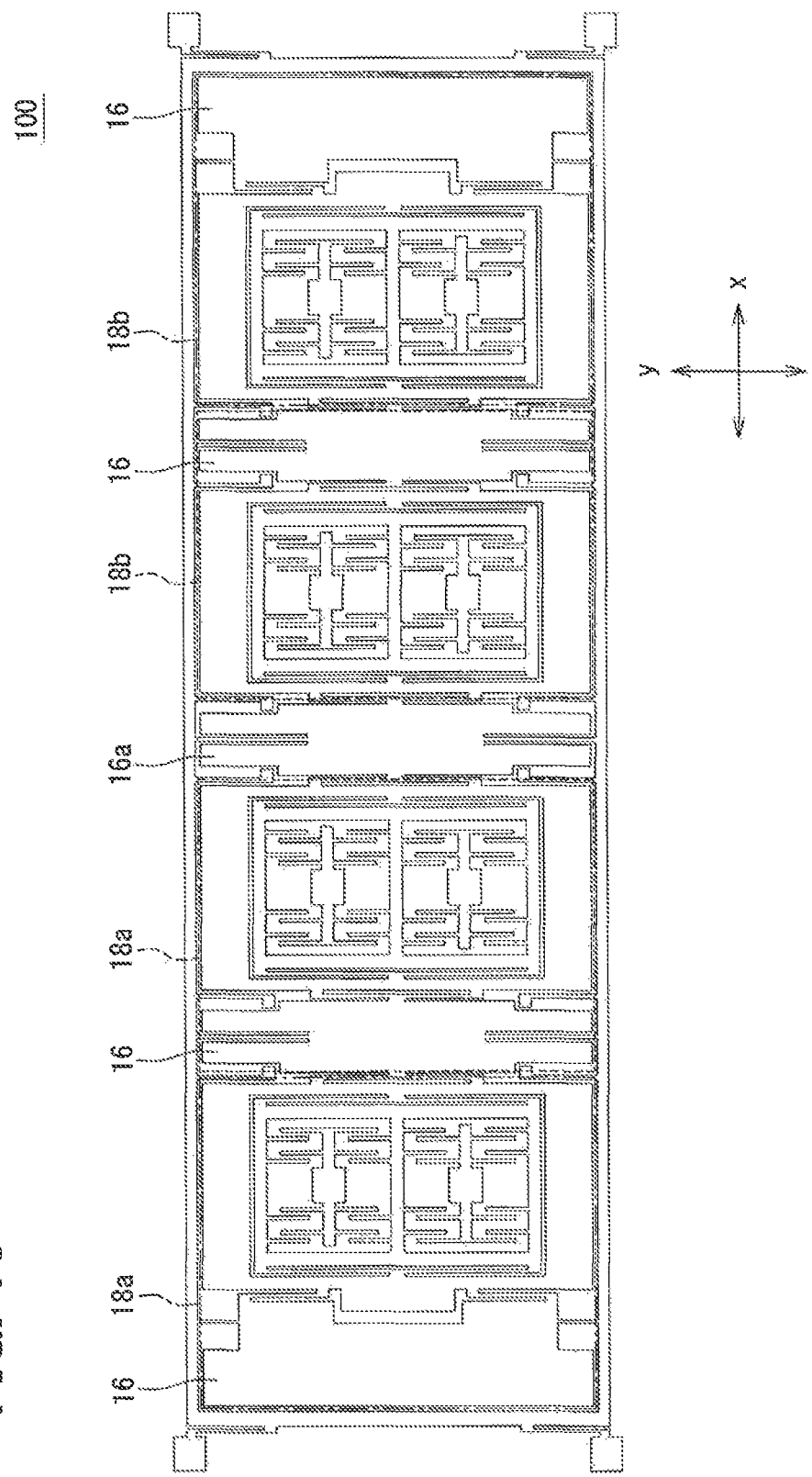
FIG. 10 is a top view illustrating a modification example of a vibrator.
Figure 11:
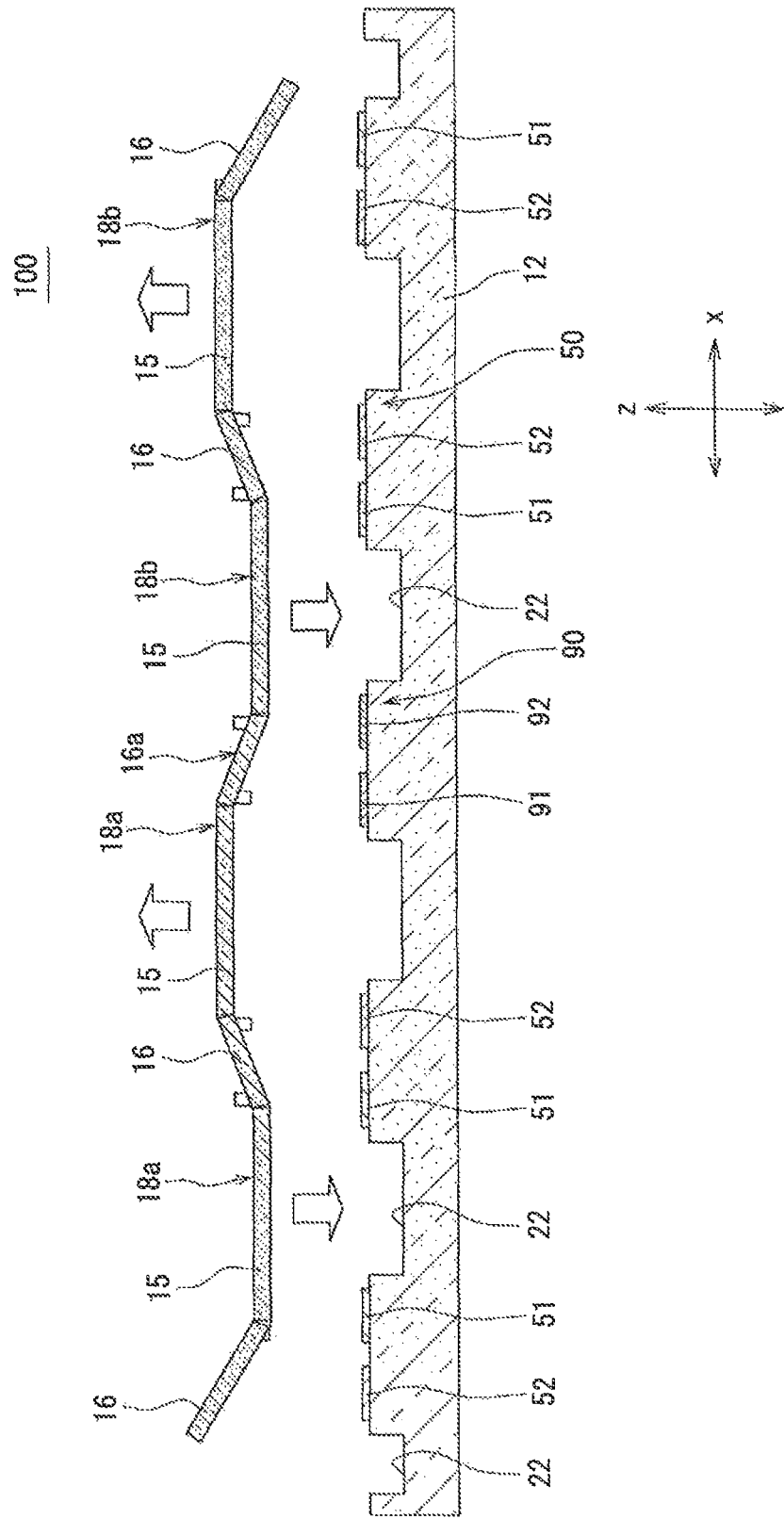
FIG. 11 is a sectional view illustrating a driving state of a vibrator in FIG. 10.

In the present embodiment, as an example, in the vibrator 11, the left unit weight 18a has one unit weight portion 18 and the right unit weight 18b has one unit weight portion 18. However, the number of the unit weight portions 18 included in the vibrator 11 is not limited to the above example. As illustrated in FIG. 10 and FIG. 11, in the vibrator 11, the left unit weight 18a may include two unit weight portions 18 and the right unit weight 18b may include two unit weight portions 18. In this manner, as the number of the unit weight portions 18 in each of the left unit weight 18a and the right unit weight 18b increases, the number of the capacitors increases, improving the detection accuracy of the angular velocity. In the case of the modification example, numbers are assigned in order leftwardly from the central weight 16a such as the first left unit weight portion 18a and the second left unit weight portion 18a; numbers are assigned in order rightwardly from the central weight 16a such as the first right unit weight portion 18b and the second right unit weight portion 18b. The inclination weight 16 of the first left unit weight portion 18a and the inclination weight 16 of the first right unit weight portion 18b have the same shape as the shape of the central weight 16a. Further, the inclination weight 16 of the second left unit weight portion 18a and the inclination weight 16 of the second right unit weight portion 18b have the same shape as the shape of the inclination weight 16 described in the first embodiment. In this manner, the respective inclination weights 16 of the unit weights 18a and 18b which are furthest from the central weight 16a have the same shape as the shape of the inclination weight 16 described in the first embodiment; other inclination weights 16 of the unit weights 18a and 18b have the same shape as the shape of the central weight 16a. In order to make clear the border lines of the unit weight portions included in the left and right unit weights 18a and 18b in FIG. 10, the first left unit weight portion 18a and the first right unit weight portion 18b are indicated by being surrounded with the broken lines; the second left unit weight portion 18a and the second right unit weight portion 18b are indicated by being surrounded with the one-dot chain lines.

In the present embodiment, as examples, the vibrator 11 is symmetrical with respect to the first penetrating direction L1 and symmetrical with respect to the second penetrating direction L2. There is no need to be limited thereto. As long as the vibrator 11 vibrates along the z direction while including the linkage region P1 liked with the linkage beam 11 becomes a wave node when the vibrator 11 vibrates along the z direction, any shape of the vibrator 11 may be adopted.

The present embodiment indicated the example in which the concave portion 22 is formed in the substrate 12. However, there may be provided with no concave portion 22.

In the present embodiment, as an example, the first facing range R1 is located in one range formed by the division by the third penetrating direction; the second facing range R2 is located in the remaining range. There is no need to be limited thereto. If the inclination weight 16 moves in the shape of the seesaw along the z direction by using the linkage region P1 as the wave node, the facing ranges R1 and R2 may not be limited to the above example. As total, a configuration may be adopted as needed where a repulsive force (attractive force) is applied to one range of the inclination weight 16 while an attractive force (repulsive force) is applied to the remaining range.

The present embodiment indicates an example that the monitor electrodes 91 and 92 face the central weight 16a. However, the monitor electrodes 91 and 92 may face an inclination weight 16 included in the unit weight portion 18. In this case, the first monitor electrode 91 may be located in one range formed by the division by the third penetrating direction; the second monitor electrode 92 may be located in the remaining range.

Further, the present embodiment indicates an example that the shape of the third facing range R3 and the shape of the fourth facing range R4 are symmetrical with respect to the first penetrating direction L1. However, the shape of the third facing range R3 and the shape of the fourth facing range R4 may not be symmetrical with respect to the first penetrating direction L1. Thus, the area of the third facing range R3 and the area of the fourth facing range R4 may not be equal.

The present embodiment did not explain an amplitude of the vibrator 11. The amplitude of vibration along the z direction of the vibrator 11 may be about one tenth the thickness along the z direction of the vibrator 11, for instance.

Aspects of the disclosure described herein are set out in the following clauses.

According to a first aspect of the present disclosure, an angular velocity sensor is characterized by including: a vibrator 11 that is located in x-y plane specified by x direction and y direction that are orthogonal to each other; a substrate 12 that is separated away from the vibrator 11 along z direction perpendicular to the x-y plane; an anchor device 13 that is extended from the substrate 12 to the x-y plane in which the vibrator 11 is located; a linkage beam device 14 that links the anchor device 13 to the vibrator 11, the linkage beam being able to twist about the y direction; an excitation portion 50 that vibrates the vibrator 11 along the z direction; and a detection portion 70 that detects an angular velocity based on a displacement along the x direction of the vibrator 11. Further, the angular velocity sensor is characterized in that the vibrator 11 includes a linkage region P1 that links with the linkage beam device 14, and the linkage region P1 becomes a wave node when the vibrator 11 vibrates along the z direction.

According to a second aspect being optional, the vibrator 11 may include up-down weights 15, inclination weights 16 linked to the linkage beam device 14, and twist beams 17 that link the inclination weights 16 to the up-down weights 15, the twist linkage beam being able to twist about the y direction. A left side and a right side may be respectively referred to as one and an other of two sides along the x direction viewed from a central weight 16a, which is one of the inclination weights 16 and located at a center in the x direction of the vibrator 11. A unit weight portion 18 may be defined as including one up-down weight 15, one inclination weight 16 next to the one up-down weight 15, and twist beams 17 linking the one up-down weight 15 with the one inclination weight 16. The vibrator 11 may include (i) a left unit weight 18a, which includes at least one unit weight portion 18, on the left side and (ii) a right unit weight 18b, which includes at least one unit weight portion 18, on the right side. The number of the at least one unit weight portion 18 of the left unit weight 18a and the number of the at least one unit weight portion 18 of the right unit weight 18b may be identical to each other such that the left unit weight 18a and the right unit weight 18b are arranged along the x direction and symmetrical with respect to the central weight 16a of the vibrator 11. The excitation portion 50 may vibrate the left unit weight 18a and the right unit weight 18b with opposite phases, respectively. The detection portion 70 may detect an angular velocity based on a displacement along the x direction of each of the left unit weight 18a and the right unit weight 18b.

Under this configuration, when an angular velocity is applied along the y direction, the left unit weight 18a located on the left side and the right unit weight 18b located on the right side move to opposite directions along the x direction. By contrast, when an external force is applied along the x direction, the left unit weight 18a and the right unit weight 18b move to an applying direction of the external force. Therefore, if a difference between a displacement of the left unit weight 18a and a displacement of the right unit weight 18b is detected, an angular velocity is detectable while canceling an influence of the external force. Thereby, the decline of the detection accuracy in the angular velocity due to the external force is suppressed.

According to a third aspect being optional, the excitation portion 50 may include (i) first driving electrodes 51 and second driving electrodes 52, which are formed in the substrate 12, and (ii) a voltage application portion 53 that applies driving voltages to the first driving electrodes 51, the second driving electrodes 52, and the vibrator 11. The first driving electrodes 51 and the second driving electrodes 52 may face the vibrator 11 along the z direction. The voltage application portion 53 may apply, as driving voltages, alternating-current voltages of the opposite phases to the first driving electrodes 51 and the second driving electrodes 52, and a constant voltage to the vibrator 11.

When attractive force repulsive force arises between the vibrator 11 and the first driving electrodes 51, repulsive force attractive force arises between the vibrator 11 and the second driving electrodes 52. Thereby, the vibrator 11 vibrates along the z direction.

According to a fourth aspect being optional, one first driving electrode 51 and one second driving electrode 52 may be arranged along the x direction and face the inclination weight 16 along the z direction. According to this, the inclination weight 16 vibrates along the z direction at a center that is positioned at the linkage region P1 linked with the linkage beam device 14; the vibrator 11 vibrates along the z direction.

According to a fifth aspect being optional, the first driving electrode 51 facing the inclination weight 16 of the left unit weight 18a and the second driving electrode 52 facing the inclination weight 16 of the right unit weight 18b may be arranged along the x direction and symmetrical with respect to the central weight 16a of the vibrator 11; and the second driving electrode 52 facing the inclination weight 16 of the left unit weight 18a and the first driving electrode 51 facing the inclination weight 16 of the right unit weight 18b may be arranged along the x direction and symmetrical with respect to the central weight 16a of the vibrator 11.

Under this configuration, the left unit weight 18a and the right unit weight 18b, which are arranged along the x direction and symmetrical with respect to the central weight 16a located at the center of the vibrator 11, vibrate with opposite phases. Thereby, the vibrator 11 vibrates along the z direction.

According to a sixth aspect being optional, in the vibrator 11, each of a shape of a facing range R1 of the inclination weight 16 facing the first driving electrode 51 along the z direction and a shape of a faced range R2 of the inclination weight 16 facing the second driving electrode 52 along the z direction are individually symmetrical with respect to a penetrating direction L1 penetrating, along the x direction, through a center of each of the unit weight portions 18.

This configuration is different from the configuration where a shape of a facing range R1 of the inclination weight facing the first driving electrode along the z direction and a shape of a facing range R2 of the inclination weight facing the second driving electrode along the z direction are individually unsymmetrical with respect to a penetrating direction L1 penetrating, along the x direction, through a center of each of the unit weight portions 18. Thus, the vibrator 11 is inhibited from moving in y-z plane specified by the y direction and the z direction. As a result, the vibrational state of the vibrator 11 is inhibited from becoming unstable, and the detection accuracy in the angular velocity is inhibited from decreasing.

According to a seventh aspect being optional, the up-down weight 15 of the left unit weight 18*a* may face a first driving electrode 51 along the z direction; the up-down weight 15 of the right unit weight 18*b* may face a second driving electrode 52 along the z direction.

Under this configuration, the left unit weight 18*a* and the right unit weight 18*b*, which are arranged along the x direction and symmetrical with respect to the central weight 16*a* located at the center of the vibrator 11, vibrate with opposite phases. Thereby, the vibrator 11 vibrates along the z direction.

According to an eighth aspect being optional, a shape of a facing range R5 of the up-down weight 15 facing the first driving electrode 51 along the z direction and a shape of a facing range R6 of the up-down weight 15 facing the second driving electrode 52 along the z direction may be individually symmetrical with respect to a penetrating direction L1 penetrating, along the x direction, through a center of each of the unit weight portions 18.

This configuration is different from the configuration where a shape of a facing range R5 of the up-down weight facing the first driving electrode along the z direction of z and a shape of the facing range R6 of the up-down weight facing the second driving electrode along the z direction are individually unsymmetrical with respect to a penetrating direction L1 penetrating along the x direction through a center of each of the unit weight portions. Thus, the vibrator 11 is inhibited from moving in the y-z plane. As a result, the vibrational state of the vibrator 11 is inhibited from becoming unstable, and the detection accuracy in the angular velocity is inhibited from decreasing.

According to a ninth aspect being optional, the linkage beam device 14 may include a main frame portion 25 surrounding the vibrator 11, first linkage beams 26 which link the anchor device 13 with the main frame portion 25, and second linkage beams 27 which link the vibrator 11 with the frame portions. The first linkage beams 26 may have flexibility along the x direction; the second linkage beams 27 may have property to twist about the y direction.

Under this configuration, the first linkage beams 26 bend when an external force is applied along the x direction. Bending of the first linkage beams 26 reduces stress applied to the vibrator 11. As a result, a displacement of the vibrator 11 due to the external force is suppressed, and the decline in the detection accuracy of the angular velocity is suppressed.

According to a tenth aspect being optional, the up-down weight 15 may include (i) a first frame portion 19 having an outer face linked with the twist beam 17, (ii) a second frame portion 20 located in a range surrounded by an inner face of the first frame portion 19, and (iii) detection beams 21 that link the first frame portion 19 with the second frame portion 20, the detection beams 21 having flexibility along the x direction. The detection portion 70 may include (i) a first detection electrode 71 formed in an inner face of the second frame portion 20, (ii) a second detection electrode 72 linked with the anchor device 13 and facing the first detection electrode 71 in either the x direction or they direction, and (iii) an angular velocity detection portion 73 that detects an angular velocity based on a change of electrostatic capacity of a capacitor formed between the first detection electrode 71 and the second detection electrode 72.

Under this configuration, the vibration along the z direction of the first frame portion 19 and the movement along the x direction of the second frame portion 20 are separated from each other with the detection beams 21 serving as a border, suppressing the variation in the movement of the second frame portion 20 due to the vibration of the first frame portion 19. A facing area and a facing gap are formed between the first detection electrode 71 and the second detection electrode 72. The facing area and the facing gap undergo variations due to the vibration of the first frame portion 19. The above configuration suppresses such variations in the facing area and the facing gap, and further suppresses the variation in the change of the electrostatic capacity of the capacitor formed between the first detection electrode 71 and the second detection electrode 72, i.e., the displacement along the x direction of the vibrator 11. As a result, the decline of the detection accuracy in the angular velocity due to the vibration of the first frame portion 19 is suppressed.

According to an eleventh aspect being optional, the substrate 12 may include a region 22, which is in a facing range facing the vibrator 11. The region 22 may have a z-directional thickness that is locally recessed towards a direction separating from the vibrator 11. This configuration inhibits the vibrator 11 from colliding with the substrate 12 when the vibrator 11 vibrates along the z direction. In addition, when the angular velocity sensor 100 is used under air atmosphere, the damping is inhibited from arising between the vibrator 11 and the substrate 12. Thus, the vibrational state of the vibrator 11 is inhibited from becoming unstable, and the detection accuracy in the angular velocity is inhibited from decreasing.

According to a twelfth aspect being optional, a monitor portion 90 may be further provided to observe a vibrational state of the vibrator 11. This permits the observation of the vibrational state of the vibrator 11.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An angular velocity sensor comprising:
   a vibrator located in an x-y plane specified by an x direction and a y direction that are orthogonal to each other;

a substrate that is separated away from the vibrator in a z direction perpendicular to the x-y plane;
an anchor device extended from the substrate to the x-y plane in which the vibrator is located;
a linkage beam device that links the anchor device with the vibrator, the linkage beam device being able to twist about the y direction;
an excitation portion that vibrates the vibrator along the z direction; and
a detection portion that detects an angular velocity based on a displacement along the x direction of the vibrator, wherein
the vibrator includes a linkage region that is linked with the linkage beam device, the linkage region becoming a wave node when the vibrator vibrates along the z direction,
the vibrator includes up-down weights, inclination weights linked to the linkage beam device, and twist beams that link the inclination weights to the up-down weights, the twist beams being able to twist about the y direction,
a left side and a right side are respectively referred to as one and an other of two sides along the x direction viewed from a central weight, which is one of the inclination weights and located at a center in the x direction of the vibrator;
a unit weight portion is defined as including one up-down weight, one inclination weight next to the one up-down weight, and twist beams linking the one up-down weight with the one inclination weight;
the vibrator includes
a left unit weight, which includes at least one unit weight portion, on the left side and
a right unit weight, which includes at least one unit weight portion, on the right side;
a number of the at least one unit weight portion of the left unit weight and a number of the at least one unit weight portion of the right unit weight are identical to each other such that the left unit weight and the right unit weight are arranged along the x direction and symmetrical with respect to the central weight of the vibrator;
the excitation portion vibrates the left unit weight and the right unit weight with opposite phases, respectively; and
the detection portion detects an angular velocity based on a displacement along the x direction of each of the left unit weight and the right unit weight;
the up-down weight includes a first frame portion having an outer face linked with the twist beams, a second frame portion located in a range surrounded by an inner face of the first frame portion, and detection beams that link the first frame portion with the second frame portion, the detection beams having flexibility along the x direction; and
the detection portion includes
first detection electrodes formed in an inner face of the second frame portion,
second detection electrodes, which are linked with the anchor device, the second detection electrodes facing the first detection electrodes in either the x direction or the y direction, and
an angular velocity detection portion that detects an angular velocity based on changes of electrostatic capacities of capacitors formed between the first detection electrodes and the second detection electrodes.

2. The angular velocity sensor according to claim 1, wherein:
the excitation portion includes
first driving electrodes and second driving electrodes, which are formed in the substrate, and
a voltage application portion that applies driving voltages to the first driving electrodes, the second driving electrodes, and the vibrator;
the first driving electrodes and the second driving electrodes face the vibrator along the z direction; and
the voltage application portion applies, as driving voltages, alternating-current voltages of the opposite phases to the first driving electrodes and the second driving electrodes, and
a constant voltage to the vibrator.

3. The angular velocity sensor according to claim 2, wherein:
one of the first driving electrodes and one of the second driving electrodes, which are arranged along the x direction, face one of the inclination weights along the z direction.

4. The angular velocity sensor according to claim 3, wherein:
the first driving electrode facing the inclination weight of the left unit weight and the second driving electrode facing the inclination weight of the right unit weight are arranged along the x direction and symmetrical with respect to the central weight of the vibrator; and
the second driving electrode facing the inclination weight of the left unit weight and the first driving electrode facing the inclination weight of the right unit weight are arranged along the x direction and symmetrical with respect to the central weight of the vibrator.

5. The angular velocity sensor according to claim 4, wherein:
in the vibrator, a shape of a facing range of the inclination weight facing the first driving electrode along the z direction and a shape of a facing range of the inclination weight facing the second driving electrode along the z direction are individually symmetrical with respect to a penetrating direction penetrating, along the x direction, through a center of each of the unit weight portions.

6. The angular velocity sensor according to claim 2, wherein:
the up-down weight of one of the left unit weight and the right unit weight faces the first driving electrode along the z direction; and
the up-down weight of an other of the left unit weight and the right unit weight faces the second driving electrode along the z direction.

7. The angular velocity sensor according to claim 6, wherein:
a shape of a facing range of the up-down weight facing the first driving electrode along the z direction and a shape of a facing range of the up-down weight facing the second driving electrode along the z direction are individually symmetrical with respect to a penetrating direction penetrating, along the x direction, through a center of each of the unit weight portions.

8. The angular velocity sensor according to claim 1, wherein:
the linkage beam device includes a main frame portion surrounding the vibrator, first linkage beams which link the anchor device with the main frame portion, and second linkage beams which link the vibrator with the main frame portion;
the first linkage beams have flexibility along the x direction; and
the second linkage beams have property to twist about the y direction.

9. The angular velocity sensor according to claim 1, wherein:
the substrate includes a region that is in a facing range facing the vibrator, the region having a thickness along the z direction to be locally recessed towards a direction separating from the vibrator.

10. The angular velocity sensor according to claim 1, further comprising:
a monitor portion that observes a vibrational state of the vibrator.

11. An angular velocity sensor comprising:
a vibrator located in an x-y plane specified by an x direction and a y direction that are orthogonal to each other;
a substrate that is separated away from the vibrator in a z direction perpendicular to the x-y plane;
an anchor device extended from the substrate to the x-y plane in which the vibrator is located;
a linkage beam device that links the anchor device with the vibrator, the linkage beam device being able to twist about the y direction;
an excitation portion that vibrates the vibrator along the z direction; and
a detection portion that detects an angular velocity based on a displacement along the x direction of the vibrator,
wherein
the vibrator includes up-down weights, inclination weights linked to the linkage beam device, and twist beams that link the inclination weights to the up-down weights, the twist beams being able to twist about the y direction,
a left side and a right side are respectively referred to as one and an other of two sides along the x direction viewed from a central weight, which is one of the inclination weights and located at a center in the x direction of the vibrator,
a unit weight portion is defined as including one up-down weight, one inclination weight next to the one up-down weight, and twist beams linking the one up-down weight with the one inclination weight,
the vibrator includes
a left unit weight, which includes at least one unit weight portion, on the left side, and
a right unit weight, which includes at least one unit weight portion, on the right side,
a number of the at least one unit weight portion of the left unit weight and a number of the at least one unit weight portion of the right unit weight are identical to each other such that the left unit weight and the right unit weight are arranged along the x direction and symmetrical with respect to the central weight of the vibrator,
the linkage beam device includes
a main frame portion surrounding the vibrator,
first linkage beams which link the anchor device with the main frame portion, and
second linkage beams which link the vibrator with the main frame portion,
the vibrator includes linkage regions that link the second linkage beams with the inclination weight of each of the left unit weight and the right unit weight that are farthest from the central weight located at the center of the vibrator, the linkage region becoming a wave node when the vibrator vibrates along the z direction, and
the inclination weight of each of the left unit weight and the right unit weight that are farthest from the central weight is divided into a projection portion and a base portion by a penetrating direction that is deviated from a center in the x direction of the inclination weight towards the central weight,
the penetrating direction penetrating along the y direction through the linkage region in the inclination weight,
the base portion being farther from the central weight than the projection portion and broader than the projection portion, permitting an end portion of the base portion along the x direction separating away from the central weight to serve as a free end.

12. The angular velocity sensor according to claim 11, wherein
the excitation portion vibrates the left unit weight and the right unit weight with opposite phases, respectively,
the detection portion detects an angular velocity based on a displacement along the x direction of each of the left unit weight and the right unit weight,
the first linkage beams have flexibility along the x direction, and
the second linkage beams being configured to twist about the y direction.

13. The angular velocity sensor according to claim 12, wherein
the excitation portion includes
first driving electrodes and second driving electrodes, which are formed in the substrate, and
a voltage application portion that applies driving voltages to the first driving electrodes, the second driving electrodes, and the vibrator,
the first driving electrodes and the second driving electrodes face the vibrator along the z direction, and
the voltage application portion applies, as driving voltages, alternating-current voltages of the opposite phases to the first driving electrodes and the second driving electrodes, and
a constant voltage to the vibrator.

14. The angular velocity sensor according to claim 13, wherein
one of the first driving electrodes and one of the second driving electrodes, which are arranged along the x direction, face one of the inclination weights along the z direction.

15. The angular velocity sensor according to claim 14, wherein
the first driving electrode facing the inclination weight of the left unit weight and the second driving electrode facing the inclination weight of the right unit weight are arranged along the x direction and symmetrical with respect to the central weight of the vibrator, and
the second driving electrode facing the inclination weight of the left unit weight and the first driving electrode facing the inclination weight of the right unit weight are arranged along the x direction and symmetrical with respect to the central weight of the vibrator.

16. The angular velocity sensor according to claim 15, wherein
in the vibrator, a shape of a facing range of the inclination weight facing the first driving electrode along the z direction and a shape of a facing range of the inclination weight facing the second driving electrode along the z direction are individually symmetrical with respect to a penetrating direction penetrating, along the x direction, through a center of each of the unit weight portions.

17. The angular velocity sensor according to claim 13, wherein
the up-down weight of one of the left unit weight and the right unit weight faces the first driving electrode along the z direction, and
the up-down weight of an other of the left unit weight and the right unit weight faces the second driving electrode along the z direction.

18. The angular velocity sensor according to claim 17, wherein
a shape of a facing range of the up-down weight facing the first driving electrode along the z direction and a shape of a facing range of the up-down weight facing the second driving electrode along the z direction are individually symmetrical with respect to a penetrating direction penetrating, along the x direction, through a center of each of the unit weight portions.

19. The angular velocity sensor according to claim 11, wherein
the up-down weight includes a first frame portion having an outer face linked with the twist beams, a second frame portion located in a range surrounded by an inner face of the first frame portion, and detection beams that link the first frame portion with the second frame portion, the detection beams having flexibility along the x direction, and
the detection portion includes
first detection electrodes formed in an inner face of the second frame portion,
second detection electrodes, which are linked with the anchor device, the second detection electrodes facing the first detection electrodes in either the x direction or the y direction, and
an angular velocity detection portion that detects an angular velocity based on changes of electrostatic capacities of capacitors formed between the first detection electrodes and the second detection electrodes.

20. The angular velocity sensor according to claim 11, wherein
the substrate includes a region that is in a facing range facing the vibrator, the region having a thickness along the z direction to be locally recessed towards a direction separating from the vibrator.

21. The angular velocity sensor according to claim 11, further comprising
a monitor portion that observes a vibrational state of the vibrator.

22. An angular velocity sensor comprising:
a vibrator located in an x-y plane specified by an x direction and a y direction that are orthogonal to each other;
a substrate that is separated away from the vibrator in a z direction perpendicular to the x-y plane;
an anchor device extended from the substrate to the x-y plane in which the vibrator is located;
a linkage beam device that links the anchor device with the vibrator, the linkage beam device being able to twist about the y direction;
an excitation portion that vibrates the vibrator along the z direction; and
a detection portion that detects an angular velocity based on a displacement along the x direction of the vibrator, wherein
the vibrator includes a linkage region that is linked with the linkage beam device, the linkage region becoming a wave node when the vibrator vibrates along the z direction,
the vibrator includes up-down weights, inclination weights linked to the linkage beam device, and twist beams that link the inclination weights to the up-down weights, the twist beams being able to twist about the y direction,
a left side and a right side are respectively referred to as one and an other of two sides along the x direction viewed from a central weight, which is one of the inclination weights and located at a center in the x direction of the vibrator,
a unit weight portion is defined as including one up-down weight, one inclination weight next to the one up-down weight, and twist beams linking the one up-down weight with the one inclination weight,
the vibrator includes
a left unit weight, which includes at least one unit weight portion, on the left side and
a right unit weight, which includes at least one unit weight portion, on the right side,
a number of the at least one unit weight portion of the left unit weight and a number of the at least one unit weight portion of the right unit weight are identical to each other such that the left unit weight and the right unit weight are arranged along the x direction and symmetrical with respect to the central weight of the vibrator,
the excitation portion vibrates the left unit weight and the right unit weight with opposite phases, respectively,
the detection portion detects an angular velocity based on a displacement along the x direction of each of the left unit weight and the right unit weight,
the linkage beam device includes a main frame portion surrounding the vibrator, first linkage beams which link the anchor device to the main frame portion, and second linkage beams which link the vibrator to the main frame portion,
the second linkage beams, which link the vibrator to the main frame portion, extend along the y direction while being configured to twist about the y direction, and
the first linkage beams, which link the anchor device to the main frame portion, extend along the y direction while having flexibility along the x direction.

23. The angular velocity sensor according to claim 22, wherein
the excitation portion includes
first driving electrodes and second driving electrodes, which are formed in the substrate, and
a voltage application portion that applies driving voltages to the first driving electrodes, the second driving electrodes, and the vibrator,
the first driving electrodes and the second driving electrodes face the vibrator along the z direction, and
the voltage application portion applies, as driving voltages, alternating-current voltages of the opposite phases to the first driving electrodes and the second driving electrodes, and
a constant voltage to the vibrator.

24. The angular velocity sensor according to claim 23, wherein
one of the first driving electrodes and one of the second driving electrodes, which are arranged along the x direction, face one of the inclination weights along the z direction.

25. The angular velocity sensor according to claim 24, wherein
the first driving electrode facing the inclination weight of the left unit weight and the second driving electrode facing the inclination weight of the right unit weight are arranged along the x direction and symmetrical with respect to the central weight of the vibrator, and
the second driving electrode facing the inclination weight of the left unit weight and the first driving electrode facing the inclination weight of the right unit weight are arranged along the x direction and symmetrical with respect to the central weight of the vibrator.

26. The angular velocity sensor according to claim 25, wherein
in the vibrator, a shape of a facing range of the inclination weight facing the first driving electrode along the z direction and a shape of a facing range of the inclination weight facing the second driving electrode along the z direction are individually symmetrical with respect to a penetrating direction penetrating, along the x direction, through a center of each of the unit weight portions.

27. The angular velocity sensor according to claim 23, wherein
the up-down weight of one of the left unit weight and the right unit weight faces the first driving electrode along the z direction, and
the up-down weight of an other of the left unit weight and the right unit weight faces the second driving electrode along the z direction.

28. The angular velocity sensor according to claim 27, wherein
a shape of a facing range of the up-down weight facing the first driving electrode along the z direction and a shape of a facing range of the up-down weight facing the second driving electrode along the z direction are individually symmetrical with respect to a penetrating direction penetrating, along the x direction, through a center of each of the unit weight portions.

29. The angular velocity sensor according to claim 22, wherein
the up-down weight includes a first frame portion having an outer face linked with the twist beams, a second frame portion located in a range surrounded by an inner face of the first frame portion, and detection beams that link the first frame portion with the second frame portion, the detection beams having flexibility along the x direction, and
the detection portion includes
first detection electrodes formed in an inner face of the second frame portion,
second detection electrodes, which are linked with the anchor device, the second detection electrodes facing the first detection electrodes in either the x direction or the y direction, and
an angular velocity detection portion that detects an angular velocity based on changes of electrostatic capacities of capacitors formed between the first detection electrodes and the second detection electrodes.

30. The angular velocity sensor according to claim 22, wherein
the substrate includes a region that is in a facing range facing the vibrator, the region having a thickness along the z direction to be locally recessed towards a direction separating from the vibrator.

31. The angular velocity sensor according to claim 22, further comprising
a monitor portion that observes a vibrational state of the vibrator.

* * * * *